W. T. BYRD.
FENDER FOR CULTIVATORS.
APPLICATION FILED JULY 22, 1910.
975,326.
Patented Nov. 8, 1910.
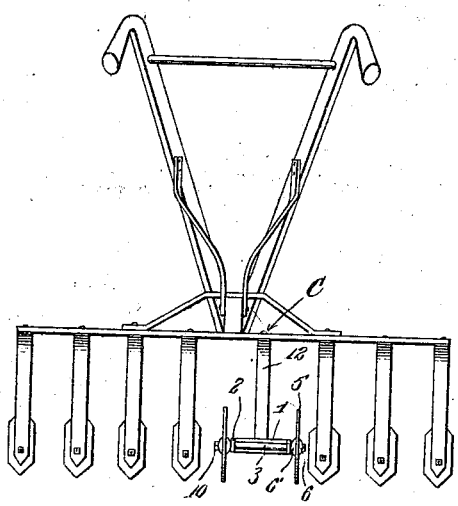
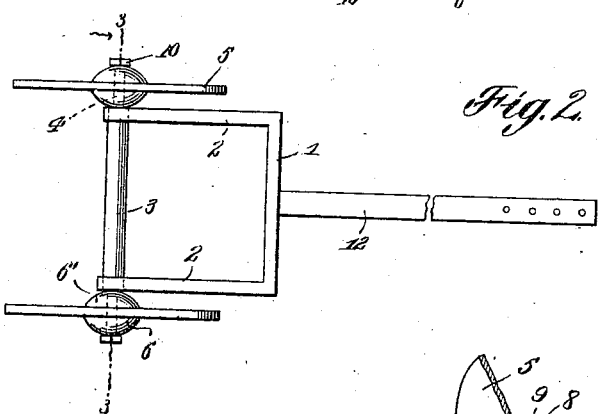
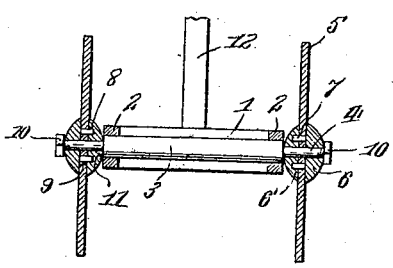
Walter T. Byrd, Inventor
By Victor J. Evans, Attorney
Witnesses
J. H. Crawford.
Wm. Bagger.

UNITED STATES PATENT OFFICE.

WALTER T. BYRD, OF LOGANVILLE, GEORGIA.

FENDER FOR CULTIVATORS.

975,326.  Specification of Letters Patent.  Patented Nov. 8, 1910.

Application filed July 22, 1910. Serial No. 573,276.

*To all whom it may concern:*

Be it known that I, WALTER T. BYRD, a citizen of the United States of America, residing at Loganville, in the county of Walton and State of Georgia, have invented new and useful Improvements in Fenders for Cultivators, of which the following is a specification.

This invention relates to fenders for cultivators and especially to rotary fenders adapted to be used in connection with spring tooth cultivators.

The invention has for its object to provide a fender of simple and improved construction which may be readily applied to and used in connection with spring tooth cultivators of any ordinary well known type.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawing,—Figure 1 is a rear elevation of a cultivator equipped with the improved fender. Fig. 2 is a top plan view of the fender detached, a portion of the draw bar having been broken off. Fig. 3 is a transverse sectional view taken on the line 3—3 in Fig. 2. Fig. 4 is a perspective detail view showing a portion of one of the fender disks and the hub members, separated.

Corresponding parts in the several figures are denoted by like characters of reference.

The frame of the improved fender is composed of a front bar 1 and side bars 2, 2 extending rearwardly from the front bar at right angles to the latter. The side bars 2, 2 are provided adjacent to their rear ends with apertures affording bearings for a shaft 3 which adjacent to the side bar is provided with reduced terminally threaded projections or spindles 4.

The disk fenders 5, 5 are provided with hubs consisting of plates or washers 6, 6' disposed adjacent to opposite faces of the disks, one of said washers being provided with projections 7 engaging recesses in the opposite washer through apertures 9 in the disk constituting the fender. The said fenders are mounted upon the spindles 4 where they are secured by means of nuts 10 bearing against the outer ends of the hubs and pressing the inner ends of said hubs into engagement with the shoulders 11 adjacent to the reduced ends of the shaft.

A draft bar 12 preferably consisting of a resilient strip of metal is secured by suitable fastening means upon the front cross bar of the frame from which it is curved upwardly and forwardly, the forward end of said draft bar being suitably connected with the frame of the cultivator shown at C.

From the foregoing description taken in connection with the drawings hereto annexed, the operation and advantages of this invention will be readily understood.

The improved fender may be very readily and quickly connected with the frame of an ordinary cultivator by fastening means such as an ordinary bolt, it being adjusted in such position that the disks 15 will run adjacent to opposite sides of the row of plants that is being operated upon and which will thus be protected from injury by clods of dirt thrown in the direction of the plants by the earth engaging teeth or blades of the cultivator.

The improved fender may be manufactured and marketed at a very small expense, and it may be readily attached to almost any well known form of cultivator.

A resilient draw bar permits the disk carrying fender frame to readily adapt itself to inequalities in the ground without disturbing its position relatively to the row of plants that is being operated upon.

Having thus described the invention, what is claimed as new, is:—

1. A fender including a frame comprising a front bar and side bars extending rearwardly therefrom and provided with apertures adjacent to their rear ends, a shaft supported for rotation in said apertures and having reduced terminally threaded portions extending beyond the side bars of the frame and forming spindles, fender disks secured upon the spindles, and a resilient draft bar connected with the front cross bar of the frame.

2. A fender including a frame comprising a front cross bar and rearwardly extending arms, a shaft supported for rotation by said arms and having reduced terminally threaded spindles, and fender disks having apertures and hubs each comprising two members, one of which is provided with projections and the other with recesses engaged by said projections through the apertures in the boxes, and nuts whereby the hubs are forced into engagement with the shoulders adjacent to the reduced spindles of the shaft.

In testimony whereof I affix my signature in presence of two witnesses.

WALTER T. BYRD.

Witnesses:
  J. G. COWN,
  K. ALLEN.